United States Patent [19]
Innerfield

[11] 3,853,710

[45] Dec. 10, 1974

[54] SERUM DIAGNOSTIC TEST FOR MALADIES CAUSING CHANGE IN FIBRINOLYTIC ACTIVITY IN THE BLOOD

[75] Inventor: Irving Innerfield, Tenafly, N.J.

[73] Assignee: Association For Pharmacologic Research, Inc., New York, N.Y.

[22] Filed: Jan. 15, 1973

[21] Appl. No.: 323,485

[52] U.S. Cl. ............ 195/99, 195/103.5 R, 23/230 B
[51] Int. Cl. ...................... G01n 31/14, G01n 31/16
[58] Field of Search ....... 195/103.5 R, 29; 23/230 B

[56] References Cited
OTHER PUBLICATIONS

Frankel et al., Ed's. "Gradwohl's Clinical Laboratory Methods and Diagnosis," vol. 1, pp. 671–676, (1970).
Fletcher, "Fed. Proceedings," 25:84–88, (1966).

*Primary Examiner*—Alvin E. Tanenholz
*Attorney, Agent, or Firm*—Blum, Moscovitz, Friedman & Kaplan

[57] ABSTRACT

A test for maladies which cause deviations in the production of fibrinolytic enzymes is carried out by adding controlled quantities of standardized thrombin and fibrinogen solutions to a serum specimen and noting the clotting time. Shortening of the clotting time from that measured with serum from healthy subjects indicates that the concentration of fibrin degradation products (FDP) is below normal. Decreased production of said FDP is taken as indicating a condition presaging the formation of a blood clot, or a significant decrease in the rate of production of fibrinolytic enzymes. Conversely, increased production of such FDP may be due to the presence of a blood clot, an embolism, severe liver disturbance, cancer, extensive myocardial infarction, or pancreatic inflammatory disease. The detection of either type of deviation can be used as the basis for diagnosis and treatment.

11 Claims, No Drawings

3,853,710

SERUM DIAGNOSTIC TEST FOR MALADIES CAUSING CHANGE IN FIBRINOLYTIC ACTIVITY IN THE BLOOD

BACKGROUND OF THE INVENTION

As is known, certain types of malfunctions of the human body are difficult to detect or require difficult and expensive procedures for the detection thereof. Blood clots are particularly pertinent examples, especially since they may indicate the imminence of a severe crisis in the individual involved. Pancreatic cancer is another example of a disturbance which is extremely difficult to diagnose without surgical exploration, but which may indicate its presence by an increase in FDP in the serum.

As aforenoted, the imminence of formation of a blood clot which may result in a coronary thrombosis and myocardial infarction is indicated by shortening of the clotting time due to a drop in the concentration of fibrinolytic enzymes and a consequent decrease in FDP.

Disturbances of the type with which the present invention is concerned have in common the property of changing the rate of production of fibrinolytic enzymes. Unfortunately, there has been, heretofore, no published test for detection of a decrease in the concentration of such fibrinolytic enzymes and FDP in the blood although a test for an increase in said enzymes and FDP has been available. Consequently, it has been difficult to use the decrease in the rate of production of fibrinolytic enzymes and the decrease in the concentration of FDP as a basis for diagnosing the causative factors involved.

SUMMARY OF THE INVENTION

A buffered thrombin solution is prepared, mixed with a standard fibrinogen solution which has been incubated at 37°C for 3 minutes, and the clotting time at room temperature is measured. This serves to standardize the buffered thrombin solution. To the standarized thrombin solution is added serum from healthy individuals, the solution is incubated for 15 minutes at 37°C, added to standard fibrinogen solution and the clotting time is then noted. The reproducibility of this test is increased by using serum only from healthy non-pregnant individuals. This establishes the normal clotting time for the standardized thrombin solution against normal serum.

Standard thrombin is mixed with serum from a patient, incubated at 37°C for 15 minutes, mixed with fibrinogen which has been incubated at 37°C for 3 minutes and the clotting time is noted. The mean clotting time for healthy ambulant individuals is 47 seconds with a standard deviation of 5 seconds. Where the subject has in his serum a larger than normal quantity of FDP, the clotting time is appreciably lengthened, generally to above 52 seconds. A clotting time below 40 seconds is taken as a strong indication of a disturbance of the type which decreases the concentration of FDP in the blood, and alerts the physician to an incipient thrombotic episode, myocardial infarction, coronary thrombosis, transplant rejection or stroke.

A clotting time of 52 seconds or above is a strong indication of a significant increase in FDP and fibrinolytic activity in the blood, such an increase requiring immediate medical treatment.

The term "normal serum" as used here denotes a standardized mixed serum obtained by allowing blood specimens from normal healthy individuals to clot, mixing the serum residues and lyophilizing same.

A thrombin solution suitable for use in the test described and having a long life at room temperature is prepared by adding thrombin to a solution of sodium oxalate, adding solid barium sulfate to adsorb any adsorbable materials introduced with the thrombin, separating off the barium sulfate by centrifugation and adding glycerol, trichloracetic acid (TCA), and normal saline. The materials adsorbed on the barium sulfate are of high molecular weight or are colloidal.

Accordingly, an object of the present invention is to provide a method of determining variation from the normal concentration of fibrinolytic enzymes and FDP in the blood of an individual.

Another object of the present invention is to provide a method of determining the presence in an individual of a malady of such a type as causes a change in fibrinolytic enzymes and FDP in the blood, such maladies including cancer, hepatitis, liver malfunction, blood clots, coronary thrombosis, cerebral thrombosis, deep vein thrombosis and pre-infarction syndrome.

A significant object of the invention is to provide a thrombin stock solution stable at room temperature for an extended period.

A particularly important objective of the invention is to provide a simple method of determining deviations from the normal quantity of fibrinolytic enzymes and FDP in the blood of a patient, using blood serum from said patient.

Still other objects and advantages of the invention will in part be obvious and will in part be apparent from the specification.

The invention accordingly comprises the several steps and the relation of one or more of such steps with respect to each of the others, and the composition possessing the features, properties and the relation of constituents, which are exemplified in the following detailed disclosure, and the scope of the invention will be indicated in the claims.

DESCRIPTION OF THE PREFERRED EMBODIMENTS

In accordance with the present invention, a blood serum specimen can be used for the determination of the concentration of fibrinolytic enzymes and FDP in the blood. As the first step the clotting time for standardized solutions of thrombin and fibrinogen with reconstituted, lyophilized mixed serum from healthy subjects is determined. The standardized reagents are then used with serum from a test subject or patient and the clotting time determined. The clotting time for the test subject is then compared with the range of clotting times determined with reconstituted, lyophilized mixed serum. The basis for this test, as aforenoted, lies in the fact that fibrinolytic activity increases in the body in the presence of a clot or severe liver disturbance such as cirrhosis, liver cancer, hepatitis, pancreatic inflammatory disease or pancreatic cancer and decreases in various types of pre-infarction syndrome pulmonary embolism and strokes due to clots or emboli. Such conditions become evident through changes in the concentration of fibrinolytic enzymes and FDP in the blood.

In normal serum, fibrin break-down products are present. In an abnormal condition, where fibrinolytic activity is increased in the blood, there will be an increase in fibrinolytic enzymes and fibrin and fibrinogen will be attacked in the blood to yield FDP which are competitive with plasma fibrinogen as substrates for the clotting reaction with the thrombin in a serum test. In the absence of, or where there is a significant decrease of breakdown products in the serum, the thrombin-fibrinogen reactions occur more rapidly then with normal serum and the clotting time on such a serum specimen is significantly shortened. When the concentration of fibrinolytic enzymes and FDP in the blood is above normal, the clotting time will be increased.

The diagnostic test of the present invention is the reaction of thrombin with fibrinogen in a serum specimen to form clotted fibrin in the presence of FDP. To utilize the diagnostic test, it is necessary to set up standard conditions, these including standardized solutions and standard reaction conditions. The process by which the reagent solutions are standardized and the test is carried out involves the following steps.

THROMBIN STOCK SOLUTION (Unstable at room temperature)

Topical thrombin in solid form is available in vials from Parke-Davis, each vial containing 1,000 NIH units. The contents of a vial are dissolved in 150 ml of normal saline or distilled water. The material must be stored in an ice bath, and is stable for only a few hours.

THROMBIN STOCK SOLUTION (Stable at room temperature)

A 5,000 unit vial of Parke-Davis topical thrombin is dissolved in 1 ml of 2 percent sodium oxalate and 4 ml of normal saline. To this is added 500 mg of barium sulfate. The mixture is incubated at 37°C at 10 minutes and then centrifuged. The liquid is removed from the barium sulfate cake which holds whatever materials are adsorbable from the thrombin. The liquid is then mixed with 20 ml of normal saline, 25 ml of glycerol and 5 mg of TCA. The solution, which holds 100 NIH units per ml, is stable for at least 6 months at room temperature.

For use, to one ml of above stock solution are added 14 ml of Veronal buffer (200 ml of 0.1M sodium barbitol, 144 ml 0.1 N HCl; brought to 1 liter with normal saline and adjusted to pH 7.4 with additional sodium barbitol, if necessary). Each ml has 6.67 NIH units therein. As is evident, other pharmaceutically acceptable buffers such as phosphate buffers and tris (hydroxymethyl) aminomethane can also be used to bring the pH to 7.4. The quantities to be used can readily be found in standard reference works.

The composition of the stable thrombin solution is not critical. For instance, the quantity of sodium oxalate can vary between about 100 mg and 1,000 mg. The incubation period may be between 5 and 15 minutes. Finally, from 15 to 35 ml of glycerol can be used with enough normal saline to bring the total volume up to 50 ml. Most important, the concentration of thrombin prepared as above is intended to give a clotting time of 15 seconds with standard fibrinogen. The concentration can be changed at will to give longer or shorter clotting times as reference points.

FIBRINOGEN SOLUTION

A standardized stock solution of fibrinogen is prepared by adding 48 mg of Warner-Lambert plasma to 5 cc of normal saline. It is the fibrinogen content of said plasma which is the active constituent.

STANDARD SERUM

To prepared standardized normal serum stock solution as a reference, 500 mg of lyophilized mixed serum from healthy nonpregnant individuals is dissolved in 50 cc of de-ionized or distilled water or in an equal quantity of normal saline. The reconstituted serum is frozen for storage. Prior to use the requisite quantity is thawed.

PROCEDURE

A number of preliminary tests are necessary to establish the performance of the various components before running a test on the serum of a patient. In the first of such tests, 0.2 ml of fibrinogen solution are placed in a test tube which is then incubated in a water bath at 37°C± 0.1°C for three minutes. The test tube is removed from the bath and to the tube is added 0.1 ml of buffered thrombin solution; the test tube is tilted back and forth or otherwise moved so as to mix the components until clotting occurs. With solutions prepared as described above, the clotting time should be 15 ± .5 seconds. This test checks out both the procedure and the solutions.

The second test which is actually a second control test is to add 0.1 of normal saline to 0.2 ml of fibrinogen solution in a test tube before putting same in the water bath. After incubation for three minutes, the test tube is removed from the bath and 0.1 ml of buffered thrombin solution is added as before. The clotting time should be 17.5 ± 0.5 seconds. This test allows for the saline or water in the reconstituted stock serum.

In the third control test, 1 part of serum stock solution is incubated with 9 parts of buffered thrombin solution for 15 minutes at 37°C. Then 0.1 ml of the incubated serum-thrombin solution is mixed with 0.2 ml of standardized fibrinogen solution and the clotting time is noted. This should be 45 ± 2.3 seconds.

The fourth control test constitutes the establishment of the range of clotting times to be expected with serum from individual healthy subjects. A test was run on serum samples from 48 control individuals ranging in age from 17 to 67 years all of whom had been examined and found to be in such condition that a change in the concentration of fibrinolytic enzymes in the blood was not to be expected. The mean clotting time proved to be 47 seconds with a standard deviation of 5 seconds. The range was 39 to 54 seconds. It should be noted that this mean clotting time, namely 47 seconds is quite close to that measured with the mixed serum of the third control test. The clotting time for the mixed serum was 45 seconds.

The method of running a test on a subject or patient is exactly the same as described in the third control test except that the patient's serum is used in preparing the incubated serumthrombin solution instead of the reconstituted, lyophilized mixed serum of the control test. It should be noted that the clotting time of the test patient is compared with the clotting time of the third control test which is based on mixed serum and therefore does not show the relatively wide deviation found with separate serum specimens from healthy individuals. The clotting time of the patient is thus compared with a standard clotting time of 45 ± 2.3 seconds.

Assuming that a variation twice the standard deviation, or approximately 10 seconds, should alert the attending physician, then a clotting time outside the range of 37 to 57 seconds is suspect. Since the range with healthy subjects has been found to be from 39 to 54 seconds, a clotting time below 39 seconds or above 54 seconds is a particularly strong indication of a pathologic state.

The following indicate the reliability of the test process as disclosed herein when applied to individuals diagnosed by other means:

Serum from 164 patients with suspected recent myocardial infarction and while still in a coronary care unit was tested. Of the 164, 112 were proved cases. All showed decrease in clotting time. The range was 29 to 39 seconds. Of those which proved to be misdiagnosed, 18 had low levels (30 – 36 seconds); these individuals on further examination were found to have pulmonary embolism or deep venous thrombosis.

A decrease in clotting time is the more serious direction of change. An increase in clotting time, say to 50 seconds or more, is taken to correlate with enhanced fibrinolytic activity in the blood due possibly to pancreatic cancer, cirrhosis of the liver or recent treatment with proteolytic enzymes.

Twelve patients with recent strokes due to hemorrhage showed no decrease in clotting time. Apparently, therefore, hemorrhage does not, of itself, give rise to an increase in fibrinolytic enzymes in the blood. In contrast, patients with thrombosis or embolism showed shortened clotting time.

Although the mechanism believed to be responsible for changing the clotting time of serums from a test patient has been discussed above, the present invention is not to be considered as being limited by any specific mechanism. The test is based on change in the clotting time of a buffered and incubated serumthrombin solution when mixed with fibrinogen solution and on the positive correlation between change in the clotting time and the presence of certain types of illnesses. Furthermore, the concentrations of thrombin, and fibrinogen solutions and the relative quantities used with serum can be varied over a range, these variations resulting in a change in the standard clotting time with healthy subjects, such changes being readily made by one skilled in the art without going beyond the bounds of the present invention. Also, an incubation temperature of 37°C is used merely because most biochemical laboratories are provided with a bath at this temperature. However, as is evident, changes in temperature or in the other parameters could be made but the clotting times would have to be established for such other conditions.

It will thus be seen that the objects set forth above, among those made apparent from the preceding description, are efficiently attained and, since certain changes may be made in carrying out the above method and in the composition set forth without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method of detecting an abnormal concentration of fibrinolytic enzymes and FDP in the blood of an individual, comprising the steps of determining the range of clotting times of standardized saline solutions of buffered thrombin, fibrinogen and mixed serum from healthy subjects combined in suitable proportions at a selected temperature, and determining the individual clotting time at the same selected temperature of the same standardized saline solutions of buffered thrombin and fibrinogen with a serum specimen from said individual combined in said suitable proportions, an individual clotting time outside said range being taken as indicative of an abnormal concentration of fibrinolytic enzymes and fibrinogen decomposition products in the blood and certain characteristic pathologic states.

2. The method as defined in claim 1, wherein said standardized solution of buffered thrombin comprises 6.7 NIH units per ml of normal saline.

3. The method as defined in claim 1, wherein the preparation of said standardized buffered thrombin solution comprises the steps of dissolving the contents of a 5,000 unit vial of topical thrombin in 1 ml of 0.5 to 5 percent sodium oxalate and 4 ml of normal saline, adding to the resultant solution a quantity of $BaSO_4$ sufficient to adsorb any colloidal or high molecular weight materials present, thereby forming a mixture, centrifuging said mixture, recovering the supernatant liquid, adding to said liquid 20 ml of normal saline, 25 ml of glycerol and 5 mg of trichloracetic acid, the solution at this stage being a stock solution stable at room temperature, bringing 1 ml of said stock solution to 1 liter with normal saline solution and adjusting the resultant thrombin-saline solution to a pH of 7.4 with a pharmaceutically acceptable buffer.

4. The method as defined in claim 3, wherein said buffer is selected from the group consisting of Veronal buffer, phosphate buffer and tris (hydroxymethyl) aminomethane.

5. The method as defined in claim 1, wherein said standardized solution of fibrinogen is prepared by dissolving dried plasma in normal saline in the ratio of 48 mg to 5 ml.

6. The method as defined in claim 1, wherein the method of preparing said standardized solution of mixed serum comprises the steps of lyophilizing and drying mixed serum from healthy subjects and dissolving the dried product in normal saline in the ratio of 500 mg to 50 ml.

7. The method as defined in claim 3, wherein the method of determining the clotting time of mixed serum from healthy subjects comprises the steps of placing 0.2 ml of fibrinogen solution containing 48 ml of plasma per 5 ml of normal saline in a test tube and incubating said fibrinogen solution for at least 3 minutes in a bath at 37°C, removing said solution from said bath, incubating 1 part of standard serum solution from healthy subjects with 9 parts of standard buffered thrombin solution for 15 minutes at 37°C, cooling the resultant serum-thrombin solution to room temperature, adding 0.1 ml of said serum-thrombin solution to said fibrinogen solution, and moving said test tube in such a way as to induce mixing until clotting occurs, said steps being repeated with a plurality of specimens of mixed serum, thereby determining the mean clotting time and the range of clotting time for mixed serum from healthy subjects.

8. The method as defined in claim 1, wherein the determination of the clotting time of the serum of an individual, comprises the steps of placing in a vessel 0.2 ml of fibrinogen stock solution, incubating said solution for at least 3 minutes in a bath at 37°C ±0.1°C, removing said test tube from said bath, incubating 1 part of serum from said individual with 9 parts of standard buffered thrombin solution for 15 minutes at 37°C, cooling the resultant serum-thrombin solution to room temperature, adding 0.1 ml of said serum-thrombin solution to said fibrinogen solution, and moving said test tube in such a manner as to mix the contents thereof until clotting occurs, a clotting time below 40 seconds or above 50 seconds being taken as indicative of certain types of maladies.

9. A stable stock solution of thrombin resulting from the process defined in claim 3.

10. A thrombin solution suitable for mixing with serum in preparation for determination of clotting time comprising 1 ml of the stock thrombin solution as defined in claim 9, diluted to 1 liter with normal saline and buffered to a pH of 7.4 with a pharmaceutically acceptable buffer.

11. The solution as defined in claim 10, wherein said buffer is selected from the group consisting of Veronal buffer, phosphate buffer and tris (hydroxymethyl) aminomethane.

* * * * *